United States Patent [19]

Nomura et al.

[11] Patent Number: 5,369,727

[45] Date of Patent: Nov. 29, 1994

[54] METHOD OF SPEECH RECOGNITION WITH CORRELATION OF SIMILARITIES

[75] Inventors: Kazuya Nomura; Taisuke Watanabe, both of Sagamihara, Japan

[73] Assignee: Matsushita Electric Industrial Co., Ltd., Osaka, Japan

[21] Appl. No.: 805,142

[22] Filed: Dec. 11, 1991

[30] Foreign Application Priority Data

May 16, 1991 [JP] Japan ................. 3-111408

[51] Int. Cl.⁵ .............................................. G10L 9/00
[52] U.S. Cl. .............................. 395/2.61; 395/2.48
[58] Field of Search ........................... 381/41–46; 395/2.48, 2.61

[56] References Cited

U.S. PATENT DOCUMENTS

| | | | |
|---|---|---|---|
| 4,349,700 | 9/1982 | Pirz et al. | 395/2.62 |
| 4,590,605 | 5/1986 | Hataoka et al. | 381/43 |
| 4,625,287 | 11/1986 | Matsuura et al. | 381/41 |
| 4,715,004 | 12/1987 | Kabasawa et al. | 381/43 |
| 4,716,593 | 12/1987 | Hirai et al. | 381/43 |

*Primary Examiner*—Allen R. MacDonald
*Assistant Examiner*—Michelle Doerrler
*Attorney, Agent, or Firm*—Lowe, Price, LeBlanc & Becker

[57] ABSTRACT

In a method of speech recognition, an input speech signal is analyzed. A result of the analysis is collated with first predetermined standard patterns. A result of the collation is outputted as a sequence of similarities. The sequence of the similarities is handled as feature parameters of the input speech signal, and the feature parameters are collated with second predetermined standard patterns of all recognition objects. A final speech recognition result is generated in accordance with a result of the collation between the feature parameters and the second predetermined standard patterns.

6 Claims, 6 Drawing Sheets

FIG. 8

| | | RECOGNITION RESULT → | | | | | | | | | | | TOTAL RECOGNITION RATE | | 1158/1198 | 96.66% |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | TOTAL | RECOG % |
| INPUT ↓ | 0 | 78 | 1 | 0 | 0 | 0 | 0 | 0 | 1 | 0 | 0 | 3 | 0 | 0 | 0 | 83 | 93.98% |
| | 1 | 0 | 79 | 0 | 0 | 0 | 0 | 0 | 0 | 2 | 0 | 1 | 1 | 0 | 0 | 83 | 95.18% |
| | 2 | 0 | 0 | 94 | 0 | 0 | 0 | 0 | 0 | 0 | 0 | 0 | 0 | 0 | 0 | 94 | 100.00% |
| | 3 | 0 | 0 | 0 | 78 | 0 | 1 | 0 | 0 | 0 | 0 | 0 | 0 | 0 | 0 | 79 | 98.73% |
| | 4 | 0 | 0 | 0 | 0 | 87 | 0 | 1 | 0 | 0 | 0 | 0 | 0 | 0 | 0 | 88 | 98.86% |
| | 5 | 1 | 0 | 0 | 0 | 0 | 87 | 0 | 0 | 0 | 0 | 0 | 0 | 0 | 0 | 88 | 98.86% |
| | 6 | 0 | 0 | 0 | 0 | 0 | 0 | 82 | 0 | 0 | 0 | 0 | 0 | 0 | 0 | 82 | 100.00% |
| | 7 | 0 | 0 | 0 | 0 | 0 | 0 | 1 | 88 | 0 | 0 | 0 | 0 | 0 | 0 | 89 | 98.86% |
| | 8 | 0 | 0 | 0 | 0 | 0 | 0 | 0 | 0 | 86 | 0 | 0 | 0 | 0 | 0 | 86 | 100.00% |
| | 9 | 0 | 0 | 0 | 0 | 0 | 0 | 0 | 0 | 0 | 79 | 9 | 0 | 0 | 0 | 88 | 89.77% |
| | 10 | 0 | 0 | 0 | 0 | 0 | 0 | 0 | 0 | 0 | 7 | 76 | 0 | 0 | 0 | 83 | 91.57% |
| | 11 | 0 | 4 | 0 | 0 | 0 | 0 | 0 | 0 | 0 | 0 | 1 | 75 | 0 | 0 | 80 | 93.75% |
| | 12 | 0 | 0 | 0 | 0 | 0 | 0 | 0 | 0 | 0 | 0 | 5 | 0 | 82 | 0 | 87 | 94.25% |
| | 13 | 0 | 0 | 0 | 1 | 0 | 0 | 0 | 0 | 0 | 0 | 0 | 0 | 0 | 87 | 88 | 98.86% |

FIG. 9

| | | RECOGNITION RESULT → | | | | | | | | | | | TOTAL RECOGNITION RATE | | 1115/1198 | 93.07% |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | TOTAL | RECOG % |
| INPUT ↓ | 0 | 79 | 0 | 1 | 1 | 0 | 0 | 0 | 1 | 0 | 0 | 0 | 1 | 0 | 0 | 83 | 95.18% |
| | 1 | 0 | 79 | 1 | 0 | 0 | 0 | 0 | 0 | 2 | 0 | 0 | 1 | 0 | 0 | 83 | 95.18% |
| | 2 | 0 | 0 | 94 | 0 | 0 | 0 | 0 | 0 | 0 | 0 | 0 | 0 | 0 | 0 | 94 | 100.00% |
| | 3 | 0 | 0 | 0 | 78 | 0 | 1 | 0 | 0 | 0 | 0 | 0 | 0 | 0 | 0 | 79 | 98.73% |
| | 4 | 0 | 0 | 0 | 0 | 88 | 0 | 0 | 0 | 0 | 0 | 0 | 0 | 0 | 0 | 88 | 100.00% |
| | 5 | 1 | 0 | 0 | 0 | 0 | 87 | 0 | 0 | 0 | 0 | 0 | 0 | 0 | 0 | 88 | 98.86% |
| | 6 | 0 | 0 | 0 | 0 | 1 | 0 | 81 | 0 | 0 | 0 | 0 | 0 | 0 | 0 | 82 | 98.78% |
| | 7 | 0 | 0 | 0 | 0 | 0 | 0 | 1 | 88 | 0 | 0 | 0 | 0 | 0 | 0 | 89 | 98.88% |
| | 8 | 0 | 0 | 0 | 0 | 0 | 0 | 0 | 0 | 86 | 0 | 0 | 0 | 0 | 0 | 86 | 100.00% |
| | 9 | 0 | 0 | 0 | 0 | 0 | 0 | 0 | 0 | 0 | 82 | 6 | 0 | 0 | 0 | 88 | 93.18% |
| | 10 | 1 | 1 | 3 | 0 | 0 | 0 | 0 | 0 | 4 | 14 | 59 | 0 | 0 | 1 | 83 | 71.08% |
| | 11 | 0 | 22 | 0 | 0 | 0 | 0 | 0 | 0 | 0 | 1 | 1 | 56 | 0 | 0 | 80 | 70.00% |
| | 12 | 0 | 0 | 5 | 0 | 0 | 0 | 0 | 0 | 2 | 3 | 4 | 0 | 73 | 0 | 87 | 83.91% |
| | 13 | 0 | 0 | 1 | 2 | 0 | 0 | 0 | 0 | 0 | 0 | 0 | 0 | 0 | 85 | 88 | 96.59% |

METHOD OF SPEECH RECOGNITION WITH CORRELATION OF SIMILARITIES

BACKGROUND OF THE INVENTION

1. Field of the Invention

This invention relates to a method of speech recognition.

2. Description of the Prior Art

Japanese published unexamined patent application 62-111293 discloses a method of speech recognition which is designed to maintain accurate recognition of speech with background noise.

According to the prior art method of speech recognition which is disclosed in Japanese application 62-111293, an input signal interval is set equal to a sufficiently long period during which speech to be recognized, noise preceding the speech, and noise following the speech occur. A temporal reference point is provided in the input signal interval. Proposed speech intervals are provided which start from the reference point and which are sequentially offset by 1-frame lengths. The shortest proposed speech interval has $N_1$ frames. The longest proposed speech interval has $N_2$ frames. The total number of the proposed speech intervals is equal to $N_2 - N_1 + 1$. The input signals in the proposed speech intervals are collated with standard patterns of recognized objects while the proposed speech intervals are expanded and contracted to a fixed time length. This collation provides the similarities or distances related to the respective recognized objects. Such collation is reiterated while the reference point is moved from the start point to the end point of the input signal interval. Consequently, the similarities related to the respective recognized objects are determined for all the proposed speech intervals and all the different reference points. The recognized object related to the maximum of the similarities is outputted as a recognition result.

The prior art method of Japanese application 62-111293 dispenses with a step of detecting the interval of speech, and uses a word spotting technique which is effective to process speech generated in environment containing noise. Specifically, a signal representing such speech is cut out of or spotted from a sufficiently long period during which the speech, noise preceding the speech, and noise following the speech occur. Speech recognition is done on the basis of the cut-out signal.

In the prior art method of Japanese application 62-111293, a feature-parameter temporal sequence is obtained by analyzing an input signal which contains components representing speech, noise preceding the speech, and noise following the speech. The feature-parameter temporal sequence is collated with standard patterns of recognized objects for all partial input signal intervals. This collation provides the similarities related to the respective recognized objects. The partial input signal interval corresponding to the highest similarity is cut out or spotted for each of the standard patterns. The recognized object related to the maximum of the similarities is outputted as a recognition result.

A description will now be given of processing input speech representing "juuichi" (a Japanese word written in Roman characters which means the numeral 11). In the prior art method of Japanese application 62-111293, a correct partial input signal interval can usually be cut out during the collation between the input speech "juuichi" and a standard pattern corresponding to "juuichi", but it is sometimes difficult to cut out a correct partial input signal interval during the collation between the input speech "juuichi" and a standard pattern "ichi" (another Japanese word written in Roman characters which means the numeral 1). This difficulty seems to be caused by the fact that "ichi" is a part of "juuichi". As a result, in some cases, the calculated similarity related to the standard pattern "ichi" is higher than the similarity related to the standard pattern "juuichi", and wrong recognition is done. Experiments using computer simulation revealed that 27.5% of the results of recognition of input speech "juuichi" generated from 80 different speakers were wrong as being judged to be speech "ichi".

SUMMARY OF THE INVENTION

It is an object of this invention to provide an improved method of speech recognition.

A first aspect of this invention provides a method of speech recognition which comprises the steps of analyzing an input speech signal; collating a result of said analyzing with first predetermined standard patterns; outputting a result of said collating as a sequence of similarities; handling the sequence of the similarities as feature parameters of the input speech signal, and collating the feature parameters with second predetermined standard patterns of all recognition objects; and generating a final speech recognition result in accordance with a result of said collating the feature parameters with the second predetermined standard patterns.

A second aspect of this invention provides a method of speech recognition which comprises the steps of analyzing an input speech signal; collating a result of said analyzing with predetermined reference patterns; outputting a result of said collating as a sequence of similarities; handling the sequence of the similarities as feature parameters of the input speech signal, and collating the feature parameters with predetermined standard patterns of recognition objects; and generating a final speech recognition result in accordance with a result of said collating the feature parameters with the predetermined standard patterns.

A third aspect of this invention provides a method of speech recognition which comprises the steps of analyzing an input speech signal; collating a result of said analyzing with first predetermined standard patterns of respective recognition objects, and generating a sequence of similarities between the result of said analyzing and the first predetermined standard patterns; handling the sequence of the similarities as feature parameters of the input speech signal, and collating the feature parameters with second predetermined standard patterns of the respective recognition objects; generating a final speech recognition result in accordance with a result of said collating the feature parameters with the second predetermined standard patterns; previously detecting a characteristic of an average of the sequences of the similarities generated in response to various sample input speech signals; and determining the second standard patterns of the respective recognition objects in accordance with said detected characteristic.

BRIEF DESCRIPTION OF THE DRAWINGS

FIG. 8 is a diagram which shows a confusion matrix indicating the frequencies of the results of speech recognition according to the embodiment of this invention.

FIG. 9 is a diagram which shows a confusion matrix indicating the frequencies of the results of speech recognition according to a prior art method.

DESCRIPTION OF THE PREFERRED EMBODIMENT

Figure 1:
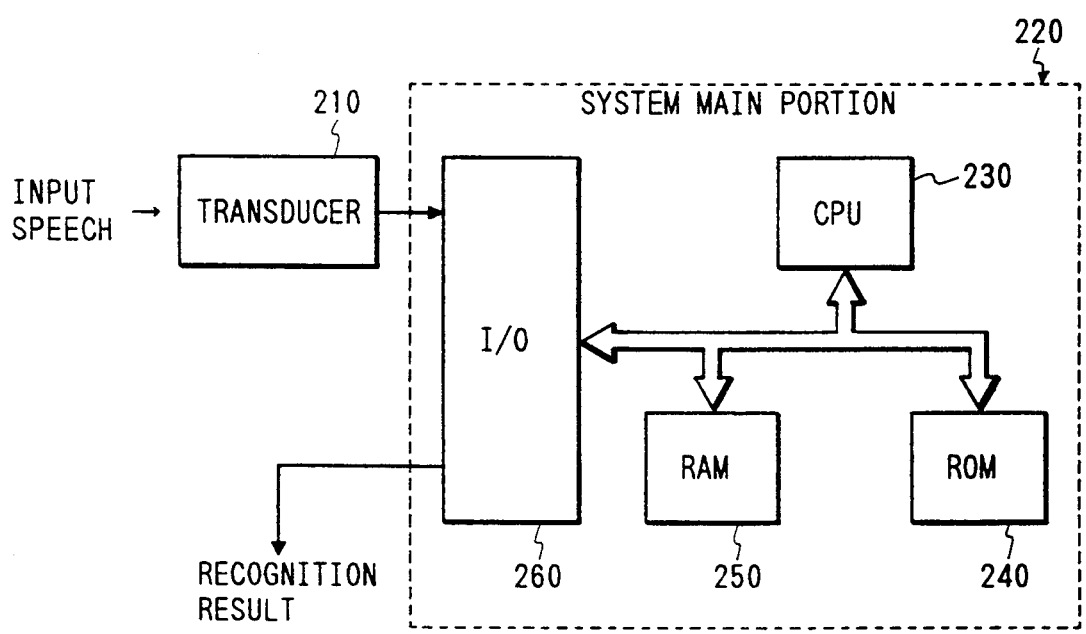
FIG. 1 is a block diagram of a speech recognition system which executes a method of speech recognition according to an embodiment of this invention.

FIG. 1 shows a speech recognition system in which a method of speech recognition according to an embodiment of this invention is executed. As shown in FIG. 1, the speech recognition system includes a transducer 210 and a system main portion 220. The system main portion 220 includes a microcomputer, a digital signal processor, or a similar device which has a combination of a CPU 230, a ROM 240, a RAM 250, and an input/output (I/O) section 260.

Speech generated by a speaker is converted by the transducer 210 into a corresponding electric speech signal. The speech signal is inputted into the system main portion 220, being subjected to a speech recognition process by the system main portion 220. The system main portion 220 outputs a signal representing the result of the recognition of the input speech.

Specifically, the speech signal is transmitted from the transducer 210 to the I/O section 260 of the system main portion 220. The I/O section 260 includes an analog-to-digital converter which digitizes the speech signal. The resultant digital speech signal is processed in the system main portion 220. The signal representing the result of the recognition of the input speech is outputted from the I/O section 260.

The system main portion 220 operates in accordance with a program stored in the ROM 240. The program is designed so as to execute the speech recognition process on the input speech signal.

Figure 2:
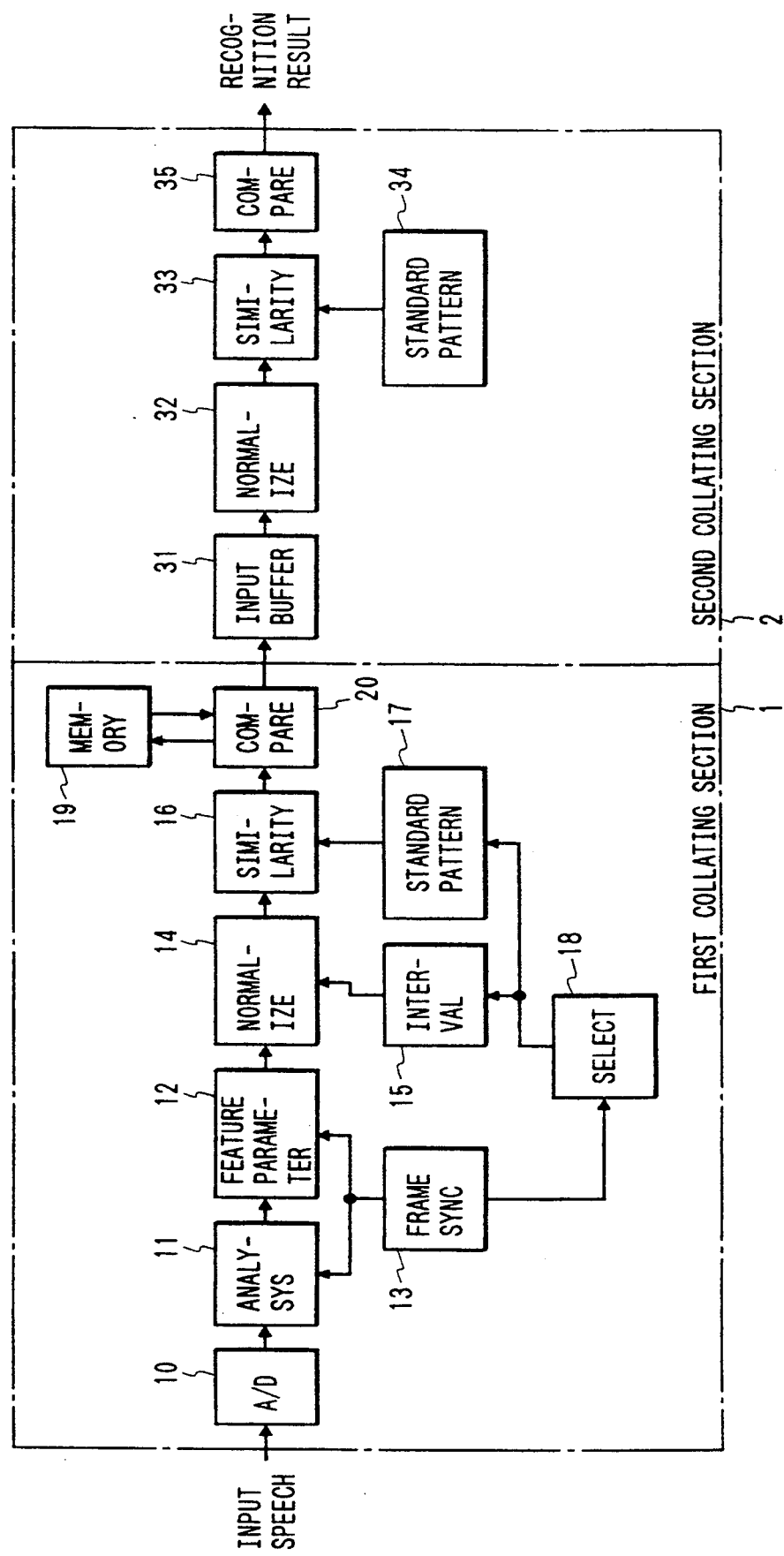
FIG. 2 is a diagram of functions in the method of speech recognition according to the embodiment of this invention.

In the field of inventions related to speech recognition systems, it is a common practice to explain the contents of the inventions with reference to diagrams of the flow of functions for an easy understanding of the inventions. It should be noted that such function flow diagrams do not directly show hardware structures. FIG. 2 is such a function flow diagram of the speech recognition system.

As shown in FIG. 2, the speech recognition system includes a first collating section 1 and a second collating section 2. The first collating section 1 is followed by the second collating section 2.

The first collating section 1 executes the following functions. An input signal interval is set equal to a sufficiently long period during which speech to be recognized, noise preceding the speech, and noise following the speech occur. A temporal reference point is provided in the input signal interval. Proposed speech intervals are provided which start from the reference point and which are sequentially offset by 1-frame lengths. The shortest proposed speech interval has $N_1$ frames. The longest proposed speech interval has $N_2$ frames. The total number of the proposed speech intervals is equal to $N_2 - N_1 + 1$. The input signals in the proposed speech intervals are collated with standard patterns of recognized objects while the proposed speech intervals are expanded and contracted to a fixed time length. This collation provides the similarities or distances related to the respective recognized objects. Such collation is reiterated while the reference point is moved from the start point to the end point of the input signal interval. Consequently, the similarities related to the respective recognized objects are determined for all the proposed speech intervals and all the different reference points. In addition, the highest value of the similarities related to each of the recognized objects is determined. The recognition-object words are cut out of or spotted from the entire input signal in the above-mentioned processes. The highest similarities related to the respective words are made into a sequence which is outputted from the first collating section 1.

The second collating section 2 receives the similarity sequence from the first collating section 1, and processes the received similarity sequence to increase the accuracy of speech recognition. The second collating section 2 uses the fact that the similarities with respect to the respective standard patterns have a tendency or characteristic depending on a recognition-object word. The second collating section 2 executes a speech recognition process based on a pattern matching technique in which the received similarity sequence is handled as feature parameters. As a result of the function of the second collating section 2, it is possible to correct a wrong recognition result which might be obtained by the first collating section 1.

Figure 3:
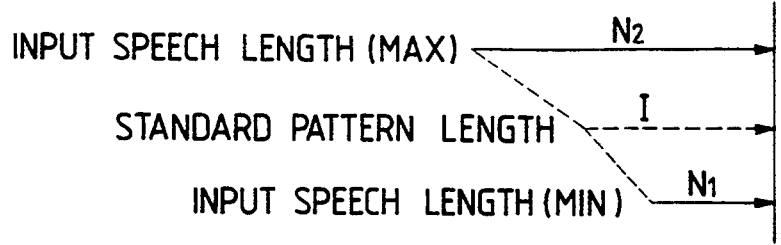
FIGS. 3, 4, and 5 are diagrams showing conditions of the expansion and contraction of a speech interval in the embodiment of this invention.

The function of the first collating section 1 will now be described in detail. The time length of a spoken word depends on speaking conditions and also on a speaker. The length of input speech is normalized to a standard speech length, and the resultant normalized input speech is subjected to a speech recognition process. FIG. 3 shows conditions of the normalization of a speech length. As shown in FIG. 3, the minimum and maximum lengths of input speech are denoted by $N_1$ and $N_2$ respectively, and a standard speech length is denoted by I. With respect to input speech having a length N ($N_1 \leq N \leq N_2$), the speech length N is normalized to the length I. As shown in FIG. 3, the end point of the normalization-resultant speech is held coincident with the end point of the original input speech. During the normalization, the expansion and contraction of the length of input speech are executed in accordance with a linear expansion and contraction equation given as:

$$n = \left[ \frac{N-1}{I-1} \cdot i + \frac{I-N}{I-1} + 0.5 \right] \quad (1)$$

where "n" and "i" denote variable integers as follows:

n = 1, 2, ..., N i = 1, 2, ..., I

Figure 4:
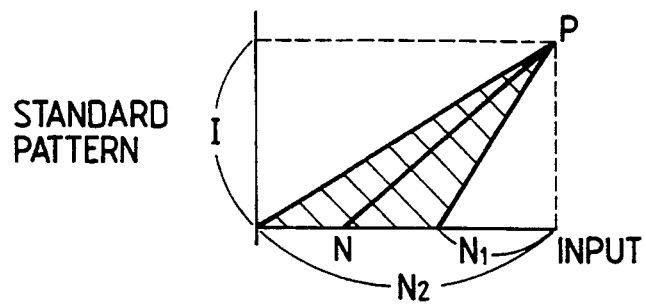

Before the similarities between unknown input speech and standard patterns are calculated, an input speech length N is contracted or expanded to a standard pattern length. FIG. 4 shows conditions of the contraction and expansion of the input speech length to the standard pattern length. In FIG. 4, the abscissa denotes the input speech length and corresponds to the time axis of the input speech, and the ordinate denotes the standard pattern length. The end points of the input speech length and the standard pattern length are made coincident. As described previously, the input speech length N is in the range of $N_1$ to $N_2$. Thus, the route of matching between the input speech and each standard pattern agrees with a straight line which starts from a point on the range of the input axis between $N_1$ and $N_2$, and which terminates at a point P corresponding to the end points of the input speech length and the standard pattern length. The similarity calculation is always executed within a region corresponding to the hatched triangle in FIG. 4.

It is now assumed that an unknown input signal having a time length Nu is present and its contents agree with speech "k" (a word "k"). The character "k" denotes an integer for identifying a word which is variable as $k=1, 2, \ldots, K$ where K agrees with the total number of words. It is also assumed that the end point of the unknown input signal is determined (known) but the start point thereof is undetermined (unknown). During the collation between the unknown input signal and a standard pattern Sk of the word "k", while the input signal length N is increased from the minimum length $N_1$ to the maximum length $N_2$ 1-frame by 1-frame, the respective frames of the input signal are expanded or contracted to the standard length I by referring to the previously-mentioned equation (1) and the similarities between the normalization-resultant input signals and the standard pattern are calculated. In this case, since the standard pattern Sk corresponds to a good result, the calculated similarity is maximized at N=Nu provided that the pronunciation of the input speech is accurate.

Figure 5:
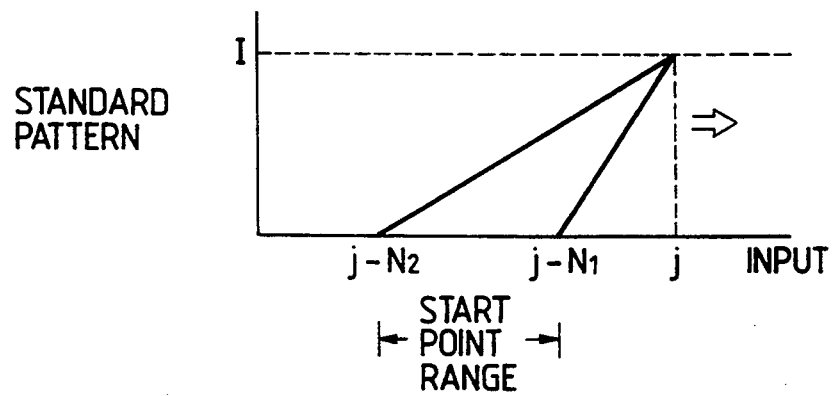

The above-mentioned process of calculating the similarities is extended or generalized so as to handle the case where both the start point and the end point of the input speech are undetermined (unknown). FIG. 5 is similar to FIG. 4 and shows conditions of the extended process of calculating similarities. In FIG. 5, the coordinate of the end point with respect to the abscissa (the input signal time axis) is denoted by "j". If the position "j" agrees with the end point of the input speech, the contents of FIG. 5 are equal to the contents of FIG. 4. In fact, the position "j" is not always in agreement with the end point of the input speech. In cases where the point "j" is moved through a range of $j_1$ to $j_2$ which is wide enough to contain the true input speech interval, there always occurs a time point $j_0$ at which the point "j" agrees with the end point of the input speech. In these cases, the start point of the input speech is equal to the point $j_0$-Nu in the range of $j_0$-$N_2$ to $j_0$-$N_1$. With respect to the collation between the input speech and a standard pattern of a good-result word (a word which agrees with the input speech), the similarity calculated at the start point $j_0$-Nu and the end point $J_0$ is greater than the similarities which are obtained at other combinations of "j" and N. In general, the highest similarity related to the standard pattern of the good-result word is greater than the similarities related to the standard patterns of wrong-result words. According to the process of FIG. 5, a portion most resemblant to a standard pattern is cut out of or spotted from an input signal which contains speech and noise components. Thus, it is unnecessary to detect an input speech interval.

A description will now be given of the calculation of similarities in the first collating section 1. As will be made clear later, similarities are calculated by using a pattern of a temporal sequence of feature parameters of input speech with reference to a statistical distance measure (a distance based on a posterior probability). The number of input speech feature parameters per frame is denoted by D. Thus, a temporal sequence pattern of input speech feature parameters corresponding to I frames agrees with a matrix having a dimension of $D \times I$. Feature parameters $x_{d,i}$ ($d=1, 2, \ldots, D$) of an i-th frame of unknown input speech are represented by a vector $x_i$ which is expressed as:

$$x_i = (x_{1,i}, x_{2,i}, \ldots, x_{d,i}, \ldots, x_{D,i}) \qquad (2)$$

The i-th frame components $a_{d,i}{}^k$ ($d=1, 2, \ldots, D$) of a standard pattern of a word "k" are represented by a vector $a_i{}^k$ which is expressed as:

$$a_i{}^k = (a_{1,i}{}^k, a_{2,i}{}^k, \ldots, a_{d,i}{}^k, \ldots, a_{D,i}{}^k) \qquad (3)$$

A temporal sequence pattern of feature parameters of the input speech is represented by a matrix x which is expressed as:

$$x = (x_1, x_2, \ldots, x_i, \ldots, x_I) \qquad (4)$$

A temporal sequence pattern of the standard pattern of the word "k" is represented by a matrix Ak which is expressed as:

$$Ak = (a_1{}^k, a_2{}^k, \ldots, a_i{}^k, \ldots, a_I{}^k) \qquad (5)$$

Figure 6:
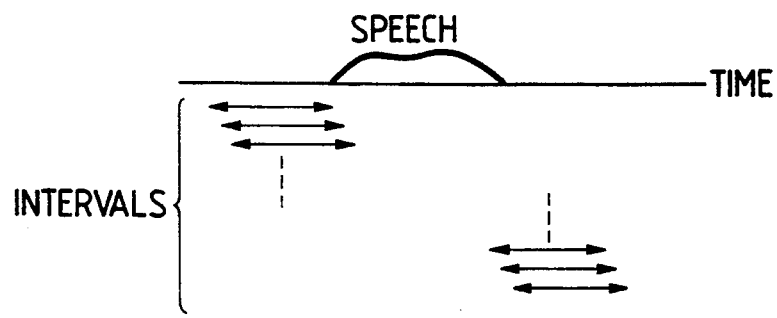
FIG. 6 is a diagram showing a plurality of intervals which are set during the generation of standard patterns in the embodiment of this invention.

The similarity $L_k$ with respect to the word "k" is given by the following equation.

$$\begin{aligned} L_k &= B_k - A_k{}^t \cdot X \\ &= B_k - \sum_{i=1}^{I} (a_i{}^k)^t \cdot x_i \\ &= B_k - \sum_{i=1}^{I} \left( \sum_{d=1}^{D} a_{d,i}^k \cdot x_{d,i} \right) \end{aligned} \qquad (6)$$

where the superscript "t" denotes a transposed vector or matrix. In the equation (6), the matrix Ak and the value Bk are determined by the standard pattern of the word "k". Specifically, the matrix Ak and the value Bk are given by the following equations.

$$Ak = 2W_a{}^{-1}(\mu k - \mu e) \qquad (7)$$

$$Bk = \mu_k{}^t \cdot W_a{}^{-1} \cdot \mu k - \mu_x{}^t \cdot W_a{}^{-1} \cdot \mu e \qquad (8)$$

where $\mu k$ denotes a mean value vector of the word "k" and $\mu e$ denotes a mean value vector of surrounding information of all words, and Wa denotes a covariance matrix which is given from covariance matrixes Wk of respective words and a covariance matrix We of surrounding information. Specifically, the matrix Wa is given by the following equation.

$$Wa = \left(\sum_{k=1}^{K} Wk + We\right)/(K+1) \quad (9)$$

where K denotes the number of the words. The mean value vector $\mu e$ and the covariance matrix We are formed by use of many samples of the respective words as follows. As shown in FIG. 6, a plurality of sub intervals which are sequentially offset by 1-frame periods are provided in a long interval containing the period of speech and periods preceding and following the speech period. Such a process is executed for each of the samples of the words. The mean value vector and the covariance matrix of parameters of the sub intervals are calculated, and the calculation results are set as the mean value vector $\mu e$ and the covariance matrix We respectively.

As shown in FIG. 2, the first collating section 1 includes an analog-to-digital (A/D) converting section 10, a speech analyzing section 11, and a feature parameter extracting section 12. The A/D converting sect/on 10 changes an input analog speech signal into a corresponding digital speech signal. The digital speech signal is outputted from the A/D converting section 10 to the speech analyzing section 11. In the speech analyzing section 11, the digital speech signal is subjected to LPC analysis every frame. The feature parameter extracting section 12 which follows the speech analyzing section 11 calculates feature parameters from the output signal of the speech analyzing section 11. The feature parameters include low-order LPC cepstrum coefficients. The calculated feature parameters are outputted from the feature parameter extracting section 12 every frame. The feature parameters may also include autocorrelation coefficients, PARCOR coefficients, and a band pass filter output.

A frame sync signal generating section 13 outputs a sync signal to the speech analyzing section 11 and the feature parameter extracting section 12 every frame. The frame sync signal generating section 13 also outputs a frame sync signal to a standard pattern selecting section 18. Similarity calculation is done with respect to a sufficiently long period which contains an input speech interval and which extends between time points corresponding to frame order numbers $j_1$ and $j_2$.

A sequence of processes is executed every frame in response to the frame sync signals outputted from the frame sync signal generating section 13. This sequence of processes will now be described. A standard pattern store section 17 holds standard patterns of preset words (recognition-object words) identified by numbers k=1, 2, ..., K respectively. The standard pattern selecting section 18 outputs a control signal to the standard pattern store section 17 in synchronism with the frame sync signal. During a 1-frame interval, the output control signal from the standard pattern selecting section 18 sequentially represents the word numbers k=1, 2, ..., K so that the standard patterns corresponding to the word numbers k=1, 2, ..., K are sequentially selected and transferred from the standard pattern store section 17 to a similarity calculating section 16. The word number signal outputted from the standard pattern selecting section 18 is also applied to a proposed period setting section 15. The proposed period setting section 15 sets a minimal interval length $N_1(k)$ and a maximal interval length $N_2(k)$ of a word designated by the word number signal. Signals representative of the minimal interval length and the maximal interval length of the word are fed from the proposed period setting section 15 to a time base normalizing section 14. As described previously, the input speech feature parameters are obtained in the feature parameter extracting section 12. The obtained input speech feature parameters are outputted from the feature parameter extracting section 12 to the time base normalizing section 14. In the time base normalizing section 14, an amount of the input speech feature parameters which corresponds to a time length N between a frame order number j-N and a frame order number "j" are arranged into a temporal sequence. The time length N is in the range between the minimal length $N_1(k)$ and the maximal length $N_2(k)$. The time base normalizing section 14 expands or contracts the time length of the sequence of the input speech feature parameters to a length of I frames according to the equation (1), and thereby obtains a normalized sequence of the input speech feature parameters which is represented by the equation (4). The normalized sequence of the input speech feature parameters is outputted from the time base normalizing section 14 to the similarity calculating section 16. The similarity calculating section 16 calculates the similarity $L_k(N)$ between the feature parameter sequence and the standard pattern according to the equation (6). The calculated similarity $L_k(N)$ is outputted from the similarity calculating section 16 to a similarity comparing section 20. The similarity comparing 20 selects the greater of the input similarity $L_k(N)$ and a similarity $\mathrm{max}L_k$ fed from a temporary memory 19. The selected greater similarity is stored into the temporary memory 19. Accordingly, the similarity $\mathrm{max}L_k$ held by the temporary memory 19 is updated when the input similarity $L_k(N)$ is greater. On the other hand the similarity $\mathrm{max}L_k$ held by the temporary memory 19 remains unchanged when the input similarity $L_k(N)$ is smaller. Such a process sequence is executed a number of times which is equal to $N_2(k)-N_1(k)+1$ for each standard pattern.

When the processing is completed for the entire input speech interval between $j_1$ and $j_2$, a sequence M of the maximal similarities $\mathrm{max}L_k$ (k=1, 2, ..., K) for the respective standard patterns is obtained. The maximal similarity sequence M is expressed as follows.

$$M = (\mathrm{max}L_1, \mathrm{max}L_2, \ldots, \mathrm{max}L_K) \quad (10)$$

When $\mathrm{max}L_k$ is denoted by $M_k$, the equation (10) is transformed into the following equation.

$$M = (M_1, M_2, \ldots, M_K) \quad (11)$$

The maximal similarity sequence M is outputted from the first collating section 1 to the second collating section 2.

Figure 10:
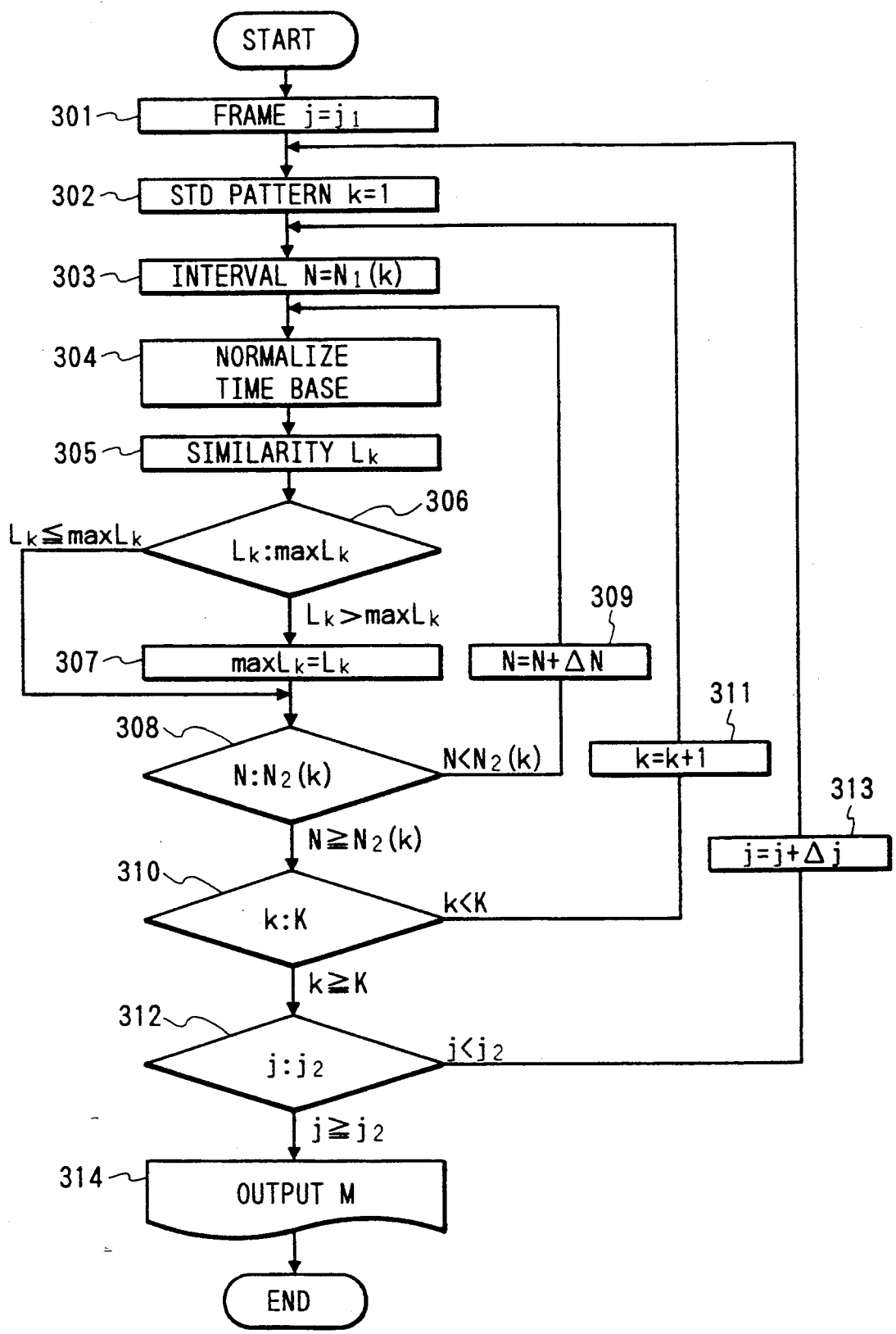
FIG. 10 is a flowchart of a portion of a program operating the system main portion in FIG. 1.

As described previously, the system main portion 220 of FIG. 1 operates in accordance with a program stored in the ROM 240. FIG. 10 is a flowchart of a portion of the program which corresponds to the first collating section 1 of FIG. 2. As shown in FIG. 10, a first step 301 of the portion of the program selects a predetermined frame $j_1$ as a frame "j" to be processed. After the step 301, the program advances to a step 302 which reads out a standard pattern of a first preset word (k=1) from a table in the ROM 240. The preset word corresponding to the currently readout standard pattern is denoted by "k". Then, the program advances to a step 303 at which an interval N to be processed is set to a minimal interval $N_1(k)$ predetermined according to the current preset word. After the step 303, the program advances to a step 304 which expands or contracts the time base of input speech to execute a normalization process. A step 305 following the step 304 calculates the similarity $L_k$ between the input speech and the standard pattern. A step 306 following the step 305 compares the current similarity $L_k$ and the greatest one $maxL_k$ of previously-calculated similarities. When the current similarity $L_k$ is greater than the previous greatest similarity $maxL_k$, the program advances to a step 307 which replaces the value of the similarity $maxL_k$ with the value of the current similarity $L_k$ to update the similarity $maxL_k$. When the current similarity $L_k$ is not greater than the previous greatest similarity $maxL_k$, the program jumps to a step 308. After the step 307, the program also advances to the step 308. The step 308 compares the current interval N and a maximal interval $N_2(k)$ predetermined according to the current preset word. When the current interval N is shorter than the maximal interval $N_2(k)$, the program advances to a step 309 which increments the current interval N by a preset unit interval $\Delta N$. After the step 309, the program returns to the step 304. When the current interval N is not shorter than the maximal interval $N_2(k)$, the program advances to a step 310. The step 310 compares the current-word identification number "k" and a preset number K corresponding to a final preset word. When the current-word identification number "k" is smaller than the preset number K, the program advances to a step 311 which increments the number "k" by 1 and which reads out the standard pattern of the preset word corresponding to the new number "k". As a result, the current preset word is updated to a next preset word. Then, the program returns to the step 303. When the current-word identification number "k" is not smaller than the preset number K, the program advances to a step 312. The step 312 compares the current-frame identification number "j" and a given number $j_2$ representing a predetermined frame. When the current-frame identification number "j" is smaller than the given number $j_2$, the program advances to a step 313 which increments the current-frame identification number "j" by a unit value $\Delta j$ so that the current frame is shifted. After the step 313, the program returns to the step 302. When the current-frame identification number "j" is not smaller than the given number $j_2$, the program advances to a step 314 which outputs a sequence M of the calculated maximal similarities $maxL_k$ (k=1, 2, ..., K). Then, the program advances to a portion (not shown) corresponding to the second collating section 2 of FIG. 2.

The function of the second collating section 2 will now be described in detail. The second collating section 2 processes the maximal similarity sequence M and executes a speech recognition process. Same words generated by different speakers vary in quality and length. In addition, there is some variation between same words generated by even a common speaker. Such a variation causes a variation between maximal similarity sequences inputted into the second collating section 2 from the first collating section 1. To compensate for the variation, the second collating section 2 normalizes the input maximal similarity sequence M. After the normalization, the second collating section 2 executes the speech recognition process. During the normalization, the greatest one $maxM_k$ of elements $M_k$ (k=1,2,..., K) in the similarity sequence M is used as a reference. Specifically, an element $M_k$ is normalized to a corresponding element $M'_k$ according to the following equation.

$$M'_k = \exp\{(M_k - maxM_k)/|maxM_k|\} \quad (12)$$

The normalization converts the similarity sequence M into a corresponding normalized similarity sequence M' which is expressed as follows.

$$M' = (M'_1, M'_2, \ldots, M'_K) \quad (13)$$

where K denotes the number of recognition-object words.

The second collating section 2 executes the speech recognition process on the normalized similarity sequence M' by using standard patterns. Japanese words "zero", "ichi", "ni", "san", "yon", "go", "roku", "nana", "hachi", "kyu", "juu", "juuichi", "juuni", and "juusan" mean numerals of 0, 1, 2, 3, 4, 5, 6, 7, 8, 9, 10, 11, 12, and 13 respectively. There is a certain relation in resemblance between these 14 Japanese words. For example, "ichi" and "juuichi" are somewhat resemblant to each other since the former is equal to a part of the latter. In addition, "juu" and "juuichi" are somewhat resemblant to each other since the former is equal to a part of the latter. On the other hand, "ichi" and "juu" are not resemblant to each other. Such a relation in resemblance is used in the speech recognition process.

Figure 7:
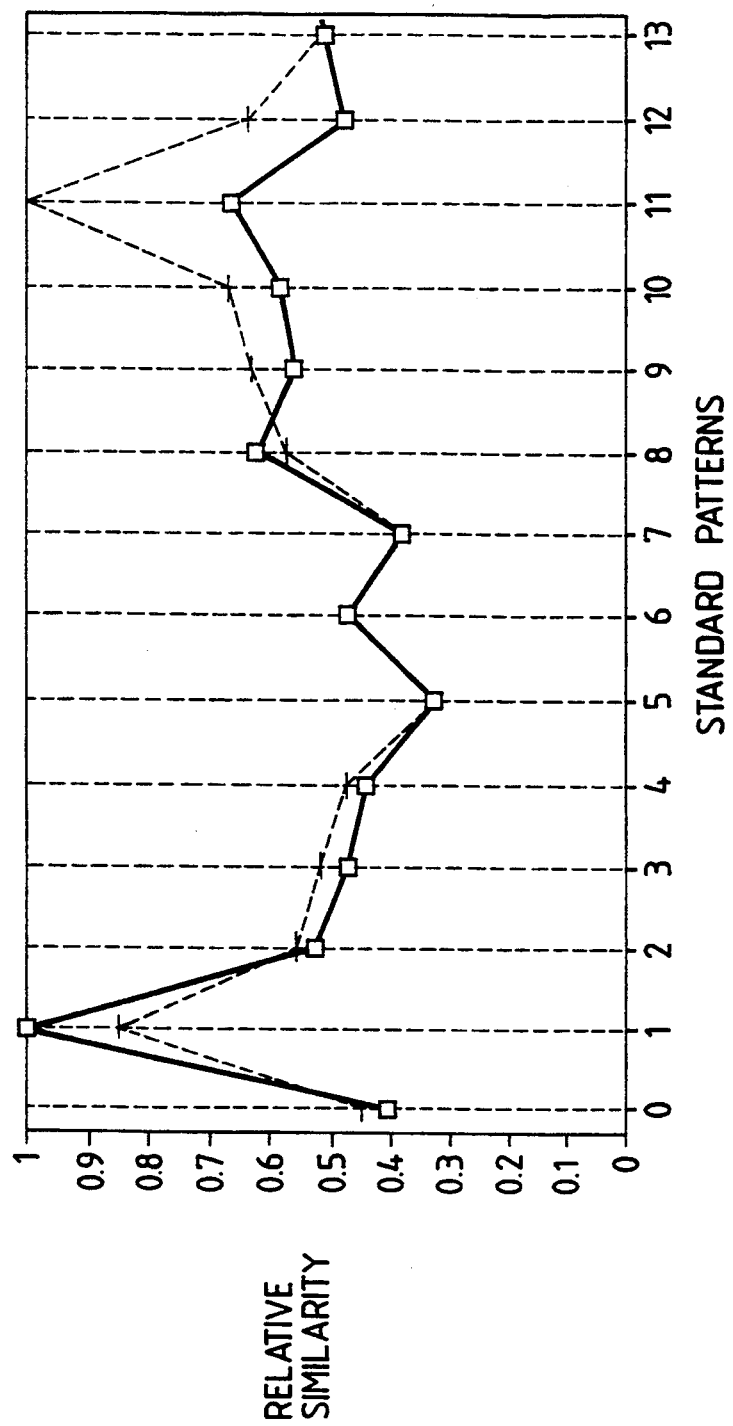
FIG. 7 is a diagram showing the distributions of similarities between 2 different input words and 14 different standard patterns.

FIG. 7 shows the results of experiments using speech data obtained from 300 different speakers. In FIG. 7, the numerals 0 to 13 on the abscissa represent the standard patterns of "zero" to "juusan" respectively, and the ordinate denotes the average relative similarity between input speech and each standard pattern. In FIG. 7, the solid lines represent the average relative similarities with respect to the input speech representing "ichi". The average relative similarity with respect to the input speech representing "ichi" peaks at the standard pattern of "ichi" (the numeral 1), and this peak is significantly higher than the similarity values obtained at the other standard patterns. In FIG. 7, the broken lines represent the average relative similarities with respect to the input speech representing "juuichi". The average relative similarity with respect to the input speech representing "juuichi" peaks at the standard pattern of "juuichi" (the numeral 11), and also peaks at the standard pattern of "ichi" (the numeral 1). The peak at "juuichi" (the numeral 11) is only slightly higher than the peak at "ichi" (the numeral 1). It is understood from FIG. 7 that the similarities with respect to the respective standard patterns have different average values. In addition, the standard deviation in such a similarity distribution is in the range of 0.004 to 0.122, and there is a strong tendency or characteristic in the similarity distribution. Accordingly, the normalized similarity sequence M' has a similar tendency or characteristic. This tendency or characteristic varies from word to word. The second collating section 2 executes a collating process based on a pattern matching technique. To increase the accuracy of speech recognition, the collating process is designed so as to consider the previously-mentioned tendency or characteristic of the normalized similarity sequence M'. All the similarities related to the respective standard patterns can provide useful information to the speech recognition process. Thus, in the second collating section 2, all the similarities related to the respective standard words are used in the speech recognition process.

As described previously, there is a word-dependent strong tendency or characteristic in the distribution of the relative similarities related to the respective standard patterns. This distribution is presumed to be in accord with the multi-dimensional normal distribution, and the tendency or characteristic is reflected in second-collating standard patterns as statistical quantities. Second similarities between the input signal sequence and the second-collating standard patterns are calculated by using a statistical distance measure. Thereby, a second collating process is done while the deviations between the input and the standard patterns which lie within a statistically allowable range are absorbed or compensated.

The statistical distance measure used in the second collating section 2 is based on the Bayesian decision. Specifically, the distance $P_k$ with respect to a word "k" is given as follows.

$$P_k = (2\pi)^{-k/2} \cdot |V_k|^{\frac{1}{2}} \cdot \exp\{-\frac{1}{2}(M'-m_k)^t \cdot V_k^{-1} \cdot (M'-m_k)\} \quad (14)$$

where $m_k$ and $V_k$ denote components of the standard pattern of the word "k". Specifically, $m_k$ represents the mean value vector of the normalized similarities related to the word "k", and $V_k$ represents the covariance matrix related to the word "k". The calculation of the logarithm of the equation (14) and the omission of the constants simplify the equation (14) to the following equation.

$$Q_k = -\frac{1}{2}(M'-m_k)^t \cdot V_k^{-1} \cdot (M'-m_k) + \log(|V_k|^{\frac{1}{2}}) \quad (15)$$

In fact, the second similarities are calculated according to the equation (15).

The second-collating standard patterns are prepared as follows. Speech data generated from 300 to 1,000 different speakers is provided as base data for preparing the standard patterns. The provided speech data is subjected to the processing in the first collating section 1, and the mean value vectors $m_k$ normalized for the respective recognition-object words and the covariance matrixes $V_k$ are determined. The determined vectors and matrixes $m_k$ and $V_k$ are used to compose the standard patterns.

As shown in FIG. 2, the second collating section 2 includes an input buffer 31 which stores the similarities sequentially outputted from the first collating section 1. The input buffer 31 outputs a sequence M of the similarities to a normalizing section 32 in response to a requirement from the normalizing section 32. The similarity sequence M is expressed by the equation (11). The normalizing section 32 normalizes the similarity sequence M into the normalized similarity sequence M' according to the equation (12). The normalized similarity sequence M' is expressed by the equation (13). The normalized similarity sequence M' is outputted from the normalizing section 32 to a similarity calculating section 33. A standard pattern store section 34 stores standard patterns of recognition-object words. The similarity calculating section 33 sequentially reads out the standard patterns from the standard pattern store section 34, and executes matching between the normalized similarity sequence M' and all the standard patterns. During the matching, the similarity $Q_k$ is calculated for each word "k" by referring to the equation (15). The calculated similarities $Q_k$ (k=1,2, ..., K) are outputted from the similarity calculating section 33 to a similarity comparing section 35. In the similarity comparing section 35, the similarities $Q_k$ (k=1,2, ..., K) are compared with each other, and the greatest one Qmax of the similarities is selected. The word corresponding to the greatest similarity Qmax is outputted from the similarity comparing section 35 as a final recognition result.

The following experiments were performed. Speech data representing the 14 different Japanese words "zero" to "juusan" were obtained from 300 different adult speakers. According to the method of this invention, standard patterns were prepared from the obtained speech data. According to the method of this invention, the speech recognition was done on same sets of input words generated by 100 different adult speakers while the abovementioned standard patterns were used. The average percentage of good results was 96.66%. FIG. 8 shows a confusion matrix indicating the frequencies of the results of the speech recognition with respect to the input words. In FIG. 8, the numerals 0 to 13 in the "input" section and the "recognition result" section denote the Japanese words "zero" to "juusan" respectively. As shown in FIG. 8, the input word "juuichi" was accurately recognized at a rate of 75/80 while the input word "juuichi" was erroneously recognized as being the word "ichi" at a rate of 4/80.

For the purpose of comparison, similar experiments were done by using the prior art method of Japanese application 62-111293. FIG. 9 corresponds to FIG. 8 and shows the results of the speech recognition according to the prior art method. In the prior art speech recognition, as shown in FIG. 9, the input word "juuichi" was accurately recognized at a rate of 56/80 while the input word "juuichi" was erroneously recognized as being the word "ichi" at a rate of 22/80. It is clear from the comparison between FIGS. 8 and 9 that the method of this invention is much advantageous over the prior art method in speech recognition accuracy.

As described previously, the first collating section 1 uses a process of linearly expanding and contracting the route of matching between the input speech and the standard pattern. This process may be replaced by other processes, such as a process disclosed in Japanese published unexamined patent application 63-125999 in which the matching route is decided by sequential calculation.

What is claimed is:

1. A method of speech recognition, comprising the steps of:

analyzing an input speech signal;

collating a result of said step of analyzing with first predetermined standard patterns of at least parts of respective recognition objects which differ from phonemes of the recognition objects;

outputting a result of said step of collating as a sequence of similarities between the result of said step of analyzing and the first predetermined standard patterns, wherein said sequence of similarities is exclusive of time base information;

handling the sequence of the similarities as feature parameters of the input speech signal, collating the feature parameters with second predetermined standard patterns of the respective recognition objects, wherein the second predetermined standard patterns are different from the first predetermined standard patterns and are exclusive of information of a time base; and generating a final speech recognition result in accordance with a result of said step of collating the feature parameters with the second predetermined standard patterns.

2. The method of claim 1 wherein said step of collating the result of the step of analyzing with the first predetermined standard patterns comprises setting an input interval for a speech signal to be collated to be sufficiently long to include a speech element, noise preceding said speech element, and noise following said speech element, determining a plurality of proposed intervals having different start points and different end points in the input interval, collating the result of the step of analyzing with the first predetermined standard patterns to calculate values of similarities between the result of the step of analyzing and the first predetermined standard patterns for the respective proposed intervals, selecting maximum values from among the calculated values of similarities for the respective first predetermined standard patterns, and outputting a sequence of the selected maximum similarities.

3. A method of speech recognition, comprising the steps of:
analyzing an input speech signal;
collating a result of said step of analyzing with predetermined reference patterns corresponding to at least parts of respective recognition objects which are longer than phonemes of the recognition objects;
outputting a result of said step of collating as a sequence of similarities between the result of said step of analyzing and the predetermined reference patterns, wherein said sequence of similarities is exclusive of time base information;
handling the sequence of the similarities as feature parameters of the input speech signal,
collating the feature parameters with predetermined standard patterns of the respective recognition objects, wherein the predetermined standard patterns are different from the predetermined reference patterns and are exclusive of time base information; and
generating a final speech recognition result in accordance with a result of said step of collating the feature parameters with the predetermined standard patterns.

4. The method of claim 3, wherein the predetermined reference patterns comprise second predetermined standard patterns of at least parts of the recognition objects, the second predetermined standard patterns being different from the first predetermined standard patterns in category,
said second predetermined standard patterns including a temporal sequence of acoustic feature components of at least parts of the recognition objects, and
said first predetermined standard patterns including sequences of similarities corresponding to the recognition objects.

5. A method of speech recognition, comprising the steps of:
analyzing an input speech signal;
collating a result of said step of analyzing with first predetermined standard patterns of at least parts of respective recognition objects which are longer than phonemes of the recognition objects, and generating a sequence of similarities between the result of said step of analyzing and the first predetermined standard patterns, wherein said sequence of similarities is exclusive of time base information;
handling the sequence of the similarities as feature parameters of the input speech signal,
collating the feature parameters with second predetermined standard patterns of the respective recognition objects, wherein the second predetermined standard patterns are different from the first predetermined standard patterns and are exclusive of time base information;
generating a final speech recognition result in accordance with a result of said step of collating the feature parameters with the second predetermined standard patterns;
detecting a characteristic of an average of the sequence of the similarities generated in response to various sample input speech signals; and
determining the second standard patterns of the respective recognition objects in accordance with said detected characteristic.

6. A method of speech recognition, comprising the steps of:
analyzing an input speech signal;
extracting preliminary feature parameters for a preliminary collating step wherein said preliminary feature parameters are collated with predetermined standard patterns, said extracting step including:
performing a preliminary extracting step for extracting said preliminary feature parameters from the input speech signal;
performing a preliminary collating step for collating the preliminary feature parameters with preliminary standard patterns at least parts of respective recognition objects which differ from phonemes of the recognition objects to derive as feature parameters of the input speech signal a sequence of similarities, wherein said sequence of similarities is exclusive of time base information;
performing a second collating step for collating said sequence of similarities derived by said preliminary collating step, by using said sequence of similarities as said feature parameters for collation with second predetermined standard patterns of the respective recognition objects, wherein the second predetermined standard patterns are different from the preliminary standard patterns and are exclusive of time base information; and
generating a speech recognition result in accordance with a result of said second collating step.

* * * * *